(12) United States Patent
Karia et al.

(10) Patent No.: US 9,714,717 B2
(45) Date of Patent: Jul. 25, 2017

(54) FLOW SWITCH ASSEMBLY FEATURING TWO-PART BASE ASSEMBLY WITH NON-METALLIC UPPER PART AND METALLIC LOWER PART

(71) Applicant: Fluid Handling LLC., Morton Grove, IL (US)

(72) Inventors: Nimesh Pratapbhai Karia, Des Plaines, IL (US); Girish Subhash Mukkawar, Lowell, MA (US); Navalkishor Birdhilal Agrawal, Vadodara (IN); Brijeshkumar Kantilal Meghpara, Cedarburg, WI (US)

(73) Assignee: Fluid Handling LLC, Morton Grove, IL (US)

( * ) Notice: Subject to any disclaimer, the term of this patent is extended or adjusted under 35 U.S.C. 154(b) by 0 days.

(21) Appl. No.: 14/452,990

(22) Filed: Aug. 6, 2014

(65) Prior Publication Data

US 2015/0041700 A1    Feb. 12, 2015

Related U.S. Application Data

(60) Provisional application No. 61/862,634, filed on Aug. 6, 2013.

(51) Int. Cl.
*H01H 3/16* (2006.01)
*H01H 3/18* (2006.01)
(Continued)

(52) U.S. Cl.
CPC .............. *F16K 25/005* (2013.01); *E03B 7/00* (2013.01); *G01F 23/56* (2013.01); *H01H 35/40* (2013.01); *H01H 2239/036* (2013.01)

(58) Field of Classification Search
CPC .. H01H 1/30; H01H 3/00; H01H 3/02; H01H 3/12; H01H 3/32; H01H 35/24;
(Continued)

(56) References Cited

U.S. PATENT DOCUMENTS

| 2,952,753 | A | * | 9/1960 | Kmiecik | ................ | H01H 35/40 |
| | | | | | | 200/81.9 R |
| 3,752,191 | A | | 8/1973 | Botnick | | |

(Continued)

FOREIGN PATENT DOCUMENTS

CN    202082405 U    11/2011

OTHER PUBLICATIONS

McDonnell & Miller a xylem brand, Installation & Maintenance Instruction Manual (MM-625C), entitled "Series FS-250 General Purpose Liquid Flow Switch." Jul. 2013, 6 pages.

(Continued)

*Primary Examiner* — Edwin A. Leon
*Assistant Examiner* — Anthony R. Jimenez
(74) *Attorney, Agent, or Firm* — Ware, Fressola, Maguire & Barber LLP

(57) ABSTRACT

A flow switch assembly features a two-part base assembly having lower and upper base parts. The lower base part is made from a metallic material, adapted on piping having a fluid flow, and configured with a central orifice to receive a paddle arm that pivots on an axis and responds to fluid flow in the piping. The upper base part is made from a non-metallic material, configured with a corresponding central orifice to receive the paddle arm, and configured with a channel to receive a pivot arm to mount and allow the paddle arm to pivot on the axis to actuate an ON/OFF switch in response to fluid flow. The non-metallic material has a lower coefficient of heat transfer than the metallic material to reduce condensation build-up in the flow switch assembly (Continued)

when the flow switch assembly is used in cold applications and exposed to temperatures below freezing.

9 Claims, 5 Drawing Sheets

(51) Int. Cl.
| | |
|---|---|
| *H01H 15/14* | (2006.01) |
| *H01H 17/12* | (2006.01) |
| *H01H 19/18* | (2006.01) |
| *H01H 21/28* | (2006.01) |
| *F16K 25/00* | (2006.01) |
| *G01F 23/56* | (2006.01) |
| *H01H 35/40* | (2006.01) |
| *E03B 7/00* | (2006.01) |

(58) Field of Classification Search
CPC .. H01H 35/26; H01H 2239/036; H01H 35/40; H01H 3/16; H01H 3/18; H01H 15/14; H01H 17/12; H01H 19/18; H01H 21/28; F16K 25/005; E03B 7/00; G01F 23/56
USPC ..... 200/47, 61.04, 81 R, 81.6, 81.9 R, 83 W
See application file for complete search history.

(56) References Cited

U.S. PATENT DOCUMENTS

| | | | |
|---|---|---|---|
| 3,834,357 A | | 9/1974 | Kaczmarek et al. |
| 3,958,596 A | | 5/1976 | Garrard |
| 4,066,858 A | | 1/1978 | Piper et al. |
| 4,117,523 A | * | 9/1978 | Masuda ................. G06K 7/087 324/252 |
| 4,590,911 A | | 5/1986 | Sciotti et al. |
| 5,076,321 A | | 12/1991 | Terry |
| 5,113,892 A | * | 5/1992 | Hull ......................... E03B 7/10 137/238 |
| 5,183,983 A | * | 2/1993 | Knop ................... H01H 35/405 200/81.9 M |
| 5,409,042 A | | 4/1995 | Kirchner |
| 5,493,086 A | | 2/1996 | Murphy, Jr. et al. |
| 5,669,335 A | | 9/1997 | Hollis |
| 6,019,115 A | | 2/2000 | Sanders |
| 6,076,546 A | | 6/2000 | Waters |
| 6,548,775 B1 | * | 4/2003 | Edwards ............... H01H 35/405 200/81.9 M |
| 6,563,064 B2 | | 5/2003 | Shafique et al. |
| 6,712,092 B2 | | 3/2004 | Toliusis |
| 7,412,988 B1 | | 8/2008 | Alexander |
| 7,497,228 B2 | | 3/2009 | Taylor et al. |
| 7,726,334 B2 | | 6/2010 | Ross, Jr. et al. |
| 7,735,696 B2 | | 6/2010 | Allsop |
| 7,878,417 B2 | | 2/2011 | Brown et al. |
| 7,891,572 B1 | | 2/2011 | Murray |
| 2002/0053603 A1 | | 5/2002 | Bernini |
| 2008/0105839 A1 | | 5/2008 | Jennings et al. |
| 2009/0020170 A1 | * | 1/2009 | Anderson et al. ......... 137/492.5 |

OTHER PUBLICATIONS

English language abstract for CN202082405U.

* cited by examiner

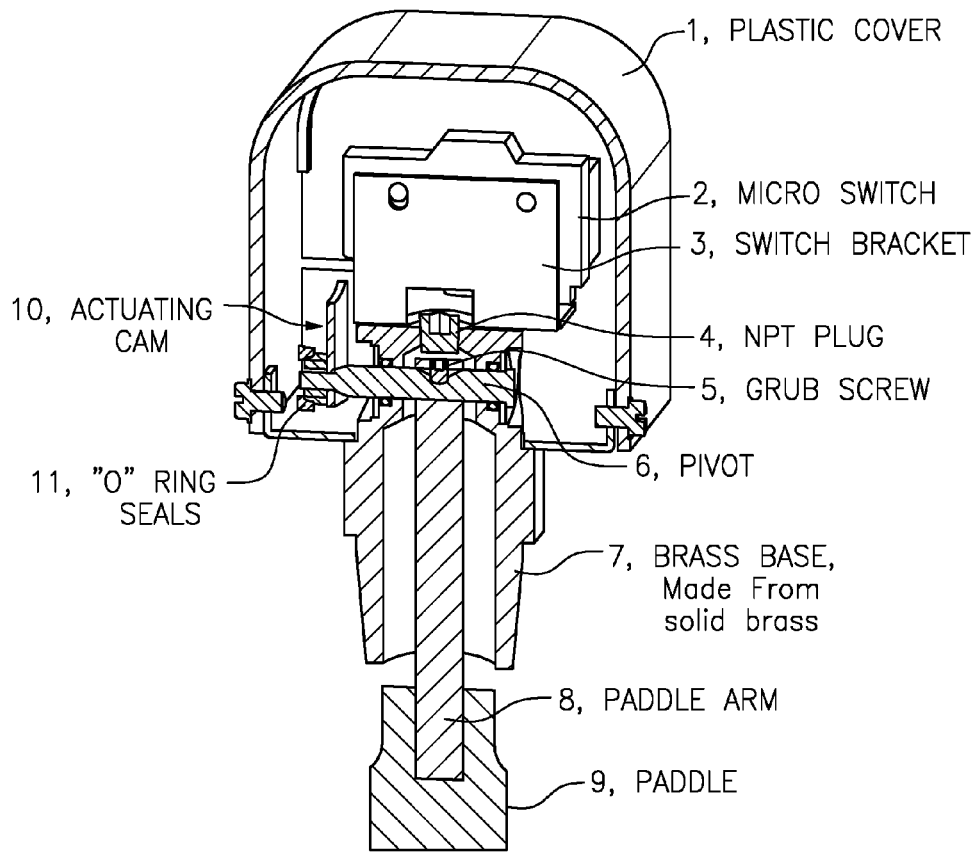
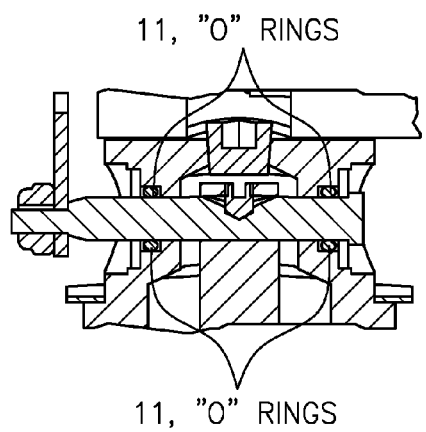
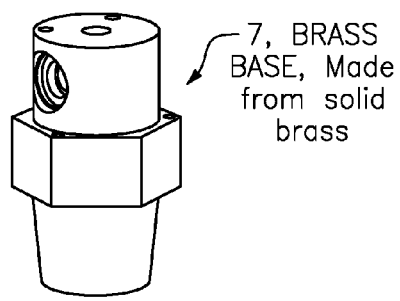
FIG. 1: Existing Design Of Low Water Cut-Off Switch (PRIOR ART)

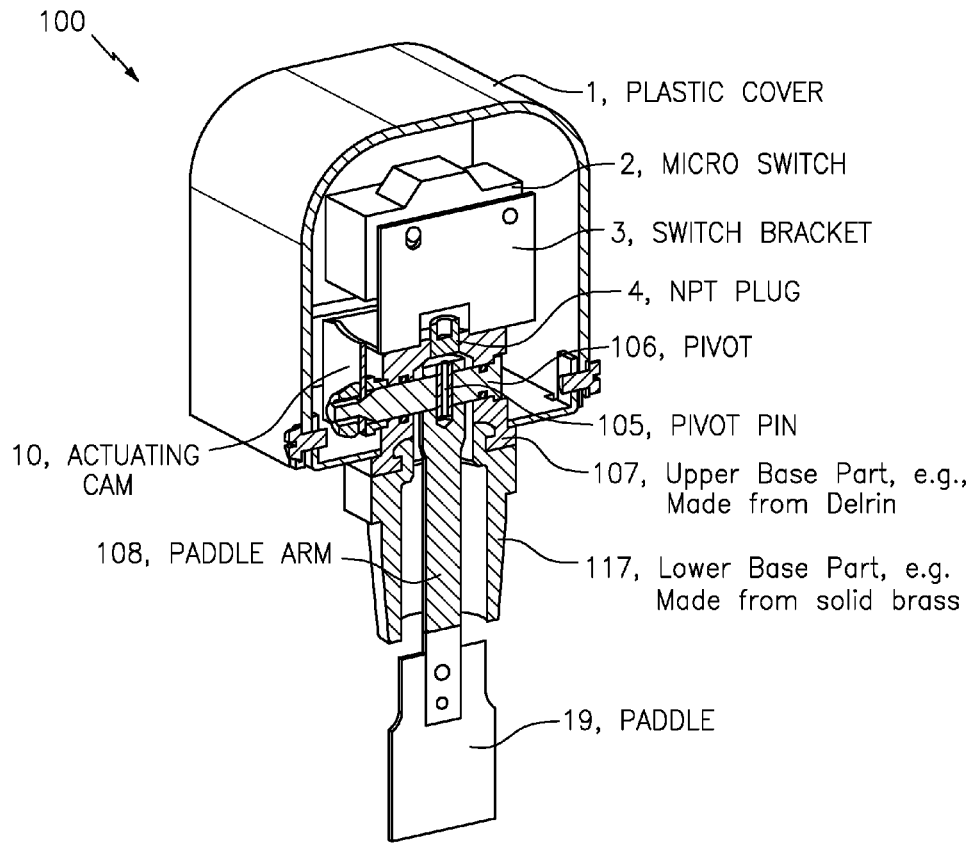
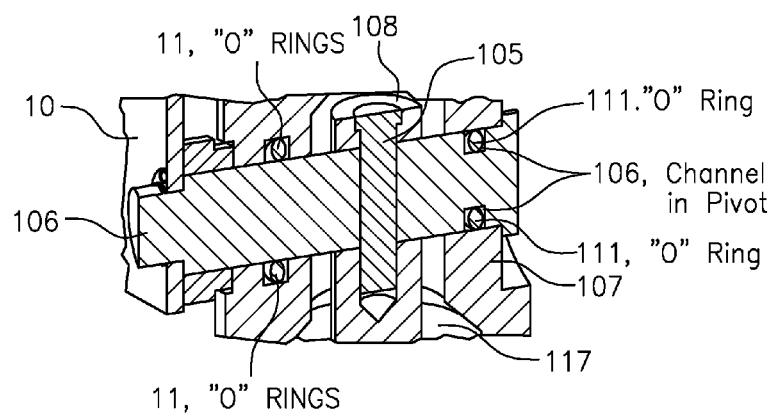
FIG. 2: Low Water Cut-Off Switch

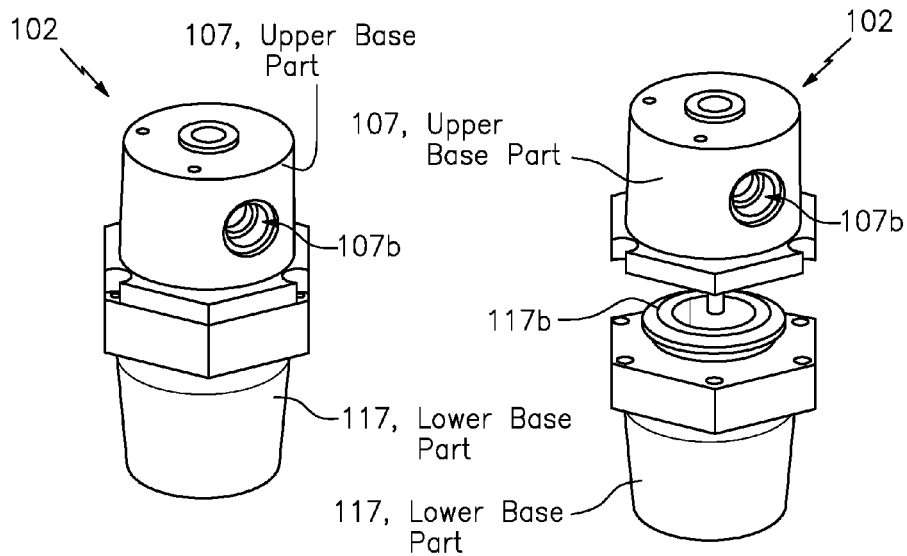
FIG. 3A: New Base Design, Lower Brass Part + Upper Delrin Part (POM)
FIG. 3B: Upper Delrin Part & Lower Brass Insert Part
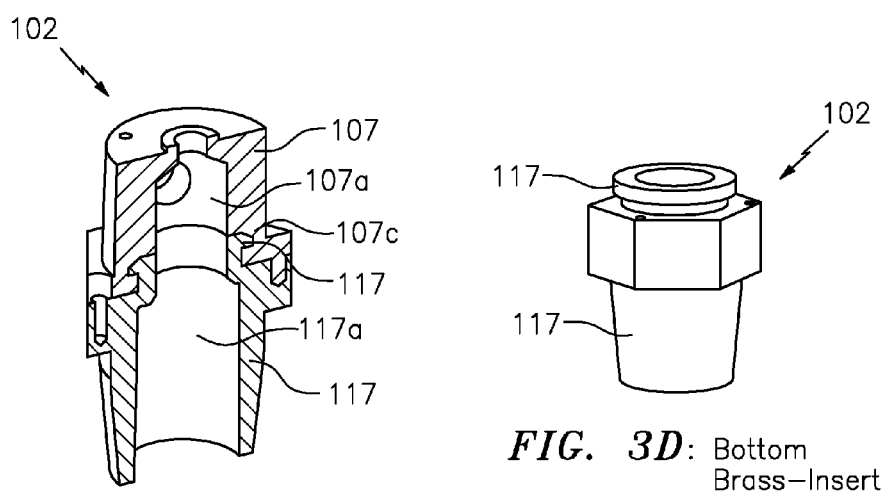
FIG. 3C: Finished/Injection molded Brass + Delrin Part – Sectional view
FIG. 3D: Bottom Brass-Insert
FIG. 3

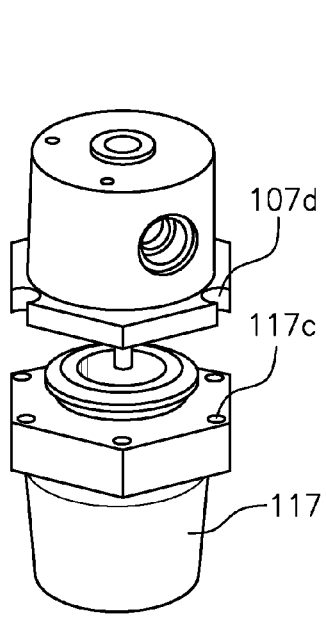
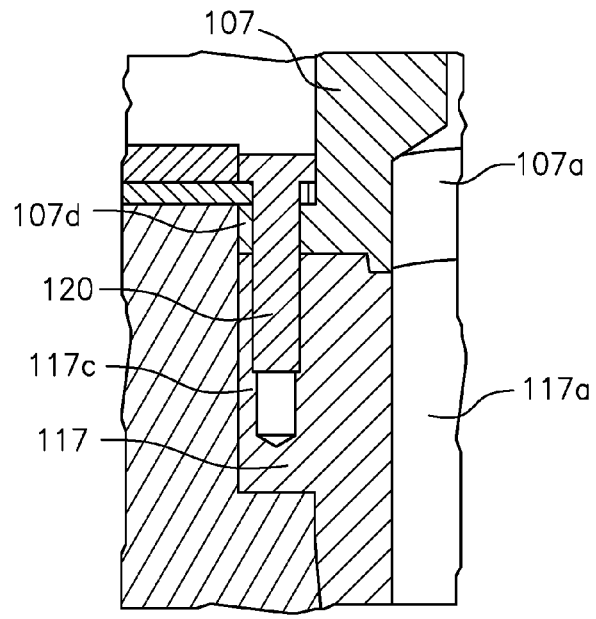
FIG. 4A(1)  FIG. 4A(2)
*FIG. 4A*: Fasteners coupling upper and lower base parts
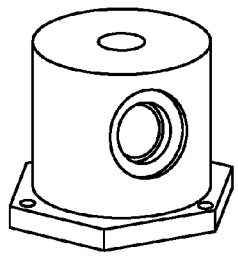
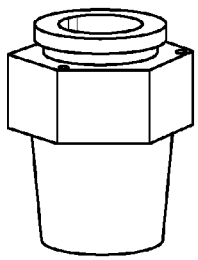
*FIG. 4B(1)*: Upper base part, 107    *FIG. 4B(2)*: Lower base part, 117
*FIG. 4B*: Adhesive coupling upper and lower base parts

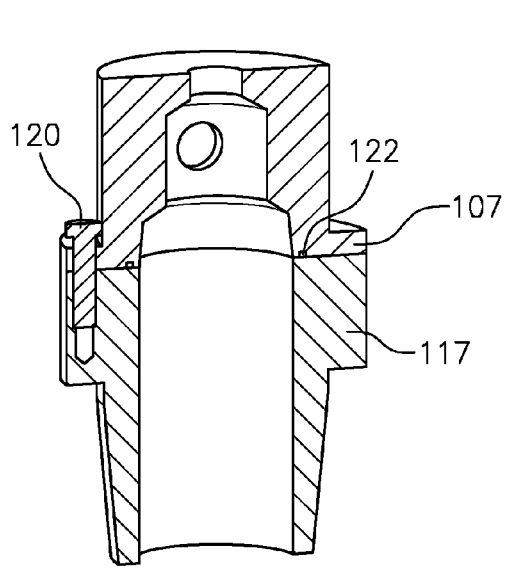
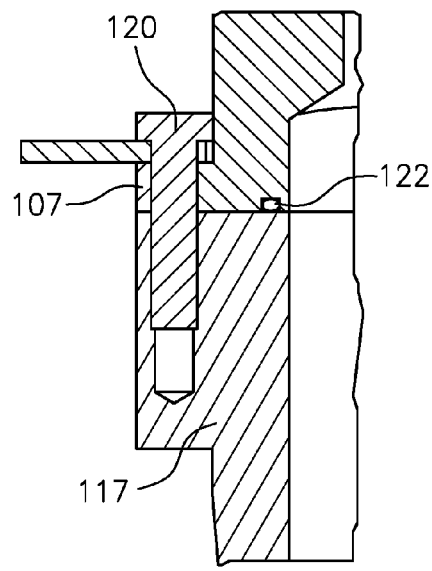
FIG. 4C(1)   FIG. 4C(2)
FIG. 4C: O-ring coupled between upper and lower base parts
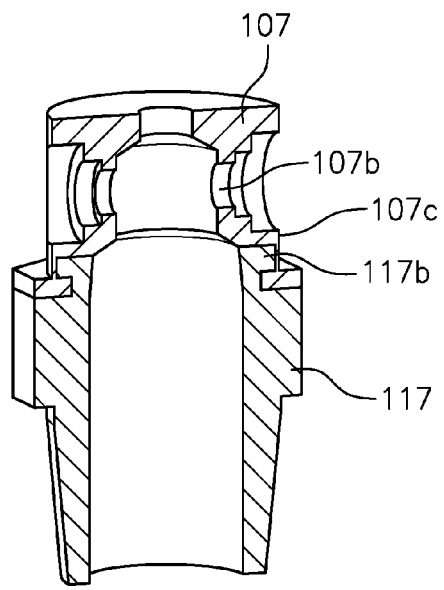
FIG. 4D
FIG. 4: Alternative Embodiments

FLOW SWITCH ASSEMBLY FEATURING TWO-PART BASE ASSEMBLY WITH NON-METALLIC UPPER PART AND METALLIC LOWER PART

CROSS-REFERENCE TO RELATED APPLICATION

This application claims benefit to provisional patent application Ser. No. 61/862,634, filed 6 Aug. 2013, which is hereby incorporated by reference in its entirety.

BACKGROUND OF THE INVENTION

1. Field of the Invention

The present invention relates to a switch; and more particularly to a switch designed for applications related to a low water cutoff.

2. Brief Description of Related Art

FIG. 1A shows an existing low water cutoff switch, e.g., having an integral brass base 7 made from solid brass. The existing low water cutoff switch is a general purpose liquid flow switch sold under the model no. FS250, e.g., by the assignee of the instant patent application. See an Instruction Manual (MM-625C), entitled "Series FS-250 General Purpose Liquid Flow Switch," which is hereby incorporated by reference.

In FIG. 1A, the existing low water cutoff switch includes the following labeled parts/components:
 a plastic cover 1;
 a micro switch 2;
 a switch bracket 3;
 a NPT plug;
 a grub screw 5;
 a pivot 6;
 the brass base 7;
 a paddle arm 8;
 a paddle 9,
 an actuating cam 10; and
 an O-ring 11.

The existing low water cutoff switch is characterized as follows:

Basic Function:
 To transfer oscillatory motion (because of liquid flow in the pipe where the switch is mounted) into vertical motion, which would actuate the micro switch 2 through the actuating cam 10 and ON/OFF signaling would be further passed on from the low cutoff switch to a given system for taking any further necessary action.

Existing Problem:
 Yielding of pivot mechanism can lead to failure, and
 Development of condensation, e.g., when flow switches are used in chiller applications.

FIG. 1B shows part of the existing low water cutoff switch in FIG. 1A, e.g., showing how the O rings 11 may be configured in part of the existing low water cutoff switch in relation to the pivot 6. FIG. 1C shows the integral brass base that forms part of the existing low water cutoff switch in FIG. 1A.

In effect, and by way of example, in the existing design the major base component is made of solid brass. When such a configuration is used in chiller application, it can result in condensation build-up in the existing low water cutoff switch, because of a heat transfer through conduction and convection, which over period of time has a tendency to make the flow switch un-operational.

There is a need to provide a better low cut-off switch that does not have such problems.

SUMMARY OF THE INVENTION

According to some embodiments, the present invention takes the form of a new and unique low water cut-off switch (also known as a flow switch) assembly featuring a two-part base assembly having a lower base part and an upper base part.

The lower base part may be made from a metallic material, configured to be adapted on piping having a fluid flow, and also configured with a central orifice to receive a paddle arm that pivots on an axis in response to the fluid flow in the piping.

The upper base part may be made from a non-metallic material, configured with a corresponding central orifice to receive the paddle arm, and configured with a channel to receive a pivot arm to mount and allow the paddle arm to pivot on the axis in order to actuate an ON/OFF switch in response to the fluid flow.

The non-metallic material of the upper base part is configured with a substantially lower coefficient of heat transfer (i.e., thermal conductivity) than the metallic material of the lower base part, so as to substantially reduce (or minimize) condensation build-up in the low water cut-off switch, e.g., when the low water cut-off switch is used in applications exposed to temperatures below freezing, including chiller applications.

In effect, the present invention is based upon the use of a combination of metal and non-metal parts for reducing condensation in a flow control switch. With the new design, by using a non-metal base part in combination with a brass insert a major chunk of metal in the overall low water cut-off switch is being reduced, and since the non-metal base part is a bad conductor of heat, e.g., compared to what a corresponding part/component made of metal material would be (like that in the prior art switch (see FIG. 1)), the non-metal base part does not allow the transfer of cold temperature/negative heat, and hence there is a substantial reduction in condensation in the overall low water cut-off switch which helps in increasing the operational life of switch.

The present invention may include one or more of the following features:

The lower base part may be made from brass.

The upper base part may be made from DELRIN® (which is a Polyoxymethylene (POM) (acetal, polyacetal, polyformaldehyde), and registered as a trademark by E. I. Dupont De Nemours And Company Corporation, 19898 1007 Market St., Wilmington, Del.).

The upper base part may be injection molded onto the lower base part and coupled together so as to form one base piece.

The lower base part may be configured with a coupling rim, and the upper base part may be configured with a coupling channel to receive the coupling rim when the upper base part is injection molded onto the lower base part.

The two-part base assembly may be configured in some combination that includes the lower base part being made from brass or stainless steel and the upper base part being made from DELRIN® or Nylon.

The lower base part may be machined, cast or forged when made.

The upper base part may be coupled to the lower base part using bolts, screws or mechanical fasteners.

The upper base part and the lower base part may be coupled together with an O-ring in between to prevent leakage.

By way of example, advantages of the new low water cutoff switch design may include:

Reduced condensation due to less conductivity of DELRIN® as compared to brass;
Reduced material cost and machining operation time;
Lesser weight; and
Ease of assembly.

BRIEF DESCRIPTION OF THE DRAWING

The drawing includes the following Figures, not necessarily drawn to scale:

FIG. 1 includes FIGS. 1A to 1C, where FIG. 1A is a cross-sectional view of an existing low water cutoff switch, e.g., having an integral brass base; where FIG. 1B is an enlarged view of part of the cross-sectional view in FIG. 1A, e.g., showing the "O" rings configured in part of the existing low water cutoff switch in relation to a pivot; and where FIG. 1C shows a perspective view of the integral brass base that forms part of the existing low water cutoff switch in FIG. 1A.

FIG. 2 includes FIGS. 2A and 2B, where FIG. 2A is a cross-sectional view of a new low water cutoff switch, e.g., having a two part base assembly, according to some embodiments of the present invention; and where FIG. 2B is an enlarged view of part of the cross-sectional view in FIG. 2A, e.g., showing the "O" rings configured in part of the new low water cutoff switch in relation to a pivot.

FIG. 3 includes FIG. 3A to 3D showing the two part base assembly that forms part of the new low water cutoff switch, according to some embodiments of the present invention, where FIG. 3A shows a perspective view of the two part base assembly; where FIG. 3B shows an exploded view of the two part base assembly, e.g., having upper and lower base parts separated; where FIG. 3C shows a one half cross-sectional view of the new two part base assembly, e.g., having upper and lower base parts coupled together; and where FIG. 3D shows a perspective view of a lower brass base that forms part of the two part base assembly.

FIG. 4 includes FIG. 4A(1) to 4D showing various options for the two part base assembly that forms part of the new low water cutoff switch, according to some embodiments of the present invention, where FIG. 4A(1) shows an exploded view of the two part base assembly, e.g., having upper and lower base parts separated, and FIG. 4A(2) shows an enlarged view of one part of the two part base assembly, e.g., for an option having a fastener coupling together upper and lower base parts; where FIG. 4B(1) shows a perspective view of an upper part of the two part base assembly, and FIG. 4B(2) shows a perspective view of a lower part of the two part base assembly, e.g., for an option having the upper part and the lower part coupled together using a permanent adhesive; where FIG. 4C(1) shows a one half cross-sectional view of the two part base assembly, and FIG. 4C(2) shows an enlarged view of one part of the two part base assembly, e.g., for an option having an "O" ring between the upper and lower base parts; and FIG. 4D shows a one half cross-sectional of the two part base assembly.

In the Figures, similar parts are labeled with similar reference numerals. Moreover, not every part is labelled with a reference numeral and lead line in every Figure, so as to reduce clutter in the drawing.

DETAILED DESCRIPTION OF THE INVENTION

FIG. 2: Low Water Cutoff Switch

FIG. 2 shows a new low water cutoff switch 100, e.g., having a two part base assembly generally understood to be indicated as 102, according to some embodiments of the present invention. See also FIGS. 3-4.

The two-part base assembly 102 may be configured having an upper base part 107 and a lower base part 117.

The lower base part 117 may be made from a metallic material, configured to be adapted on piping (not shown) having a fluid flow, and also configured with a central orifice 117a to receive a paddle arm 108 that pivots on an axis in response to the fluid flow in the piping.

The upper base 107 part may be made from a non-metallic material, configured with a corresponding central orifice 107a to receive the paddle arm 108, and configured with a channel 107b to receive a pivot or pivot arm 106 to mount and allow the paddle arm 108 to pivot on the axis in order to actuate an ON/OFF switch (e.g. the micro switch 2) in response to the fluid flow. The paddle arm 108 may be understood to be pivoting on the axis, e.g., along the longitudinal axis of the pivot 106.

The non-metallic material of the upper base part 107 has a substantially lower coefficient of heat transfer (i.e., thermal conductivity) than the metallic material of the lower base part 117, so as to substantially reduce (or minimize) condensation build-up in the low water cut-off switch, e.g., especially when the low water cut-off switch is used in applications exposed to temperatures below freezing, including chiller applications.

In FIG. 2, the new low water cutoff switch includes the following labeled parts/components:
the plastic cover 1 (see FIG. 1A);
the micro switch 2 (see FIG. 1A);
the switch bracket 3 (see FIG. 1A);
the NPT plug 4 (see FIG. 1A);
a pivot pin 105;
the pivot 106;
a circumferential channel 106a;
the upper base part 107, e.g. made from DELRIN®;
the lower base part 117, e.g., made from solid brass;
the paddle arm 108;
a paddle 9,
an actuating cam 10;
an O-ring 11 (see FIG. 1A); and
an O-ring 111.

The lower base part 117 may be made from brass, as well as other suitable metallic material either now known or later developed in the future. The upper base part 107 may be made from DELRIN®, as well as other suitable non-metallic material either now known or later developed in the future. By way of example, embodiments are envisioned in which the two-part base assembly 102 may be configured in some combination that includes the lower base part 117 being made from brass or stainless steel and the upper base part 107 being made from DELRIN® or Nylon.

The upper base part 107 may be injection molded onto the lower base part 117 and coupled together so as to form one integrated or combined base piece.

The lower base part 117 may be configured with a coupling rim 117b, and the upper base part 107 may be configured with a coupling channel 107c to receive the coupling rim 117b when the upper base part 107 is injection molded onto the lower base part 117. The lower base part 117 may be machined, cast or forged when made.

The upper base part 107 may be coupled to the lower base part 117 using bolts, screws or mechanical fasteners 120 (FIG. 4A(2)) that are passed through suitable openings or cavities 107d in the upper base part 107 and received by suitable openings or cavities 117c the lower base part 117, e.g., consistent with that shown in FIGS. 3A to 3C and 4A to 4C.

The upper base part 107 and the lower base part 117 may be coupled together with an O-ring 122 in between to prevent leakage.

In effect, when compared to the existing design in FIG. 1, the basic idea of the present invention includes using one or more of the following new features:

- Insert the pivot pin 105 through the pivot 106 in order to provide more strength to the mechanism (when compared to the grub screw 5 (FIG. 1) which is not inserted through the pivot 6),
- Increase the diameter of pivot pin 105 (when compared to the grub screw 5 (FIG. 1)), and
- Use a metal/non-metal base combination to minimize the condensation, e.g., in freezer type applications.

FIG. 3: The Two Part Base Assembly 102

FIG. 3 shows the two part base assembly 102 that forms part of the new low water cutoff switch, according to some embodiments of the present invention.

In FIG. 3, the basic idea of the design according to the present invention may be summarized, as follows:

The brass base 7 (FIG. 1A) has effectively been split into two different parts, including the upper base part 107, e.g., which may be made of a non-metallic material such as DELRIN®, and the lower base part 117, e.g., which may be made of a metallic material such as solid brass. By way of example, when the brass base 7 in FIG. 1A and the two part base assembly 102 are compared, the brass base 7 has effectively been split into two different halves, including the upper base part 107 and the lower base part 117. In operation, when the low water cutoff switch is arranged in relation to the piping (not shown), the lower base part 117 is generally understood to be the part immersed within the piping and subject to the adverse conditions caused by the liquids flowing in the piping, e.g., including conditions related to caustic chemicals flowing in the piping.

The bottom brass part 117 may be machined, and then upper base part may be formed from DELRIN® by injecting it over and above the lower brass part 117, so that the two parts/pieces become solid and act as one integrated piece.

The design of the combine brass base part/component and Delrin base part/component may be made such that they would provide a locking effect during the switch's operation under pressure.

The scope of the invention is intended to include using various other combination of materials for the metal and non-metal combination, e.g., including but not limited to, at least the following:

- Stainless steel with DELRIN®, or
- Stainless steel with Nylon GF, or
- Brass with Nylon GF, etc.

Other alternate designs are also envisioned which can be made using this approach for low water cutoff application within the scope and spirit of the present invention.

FIG. 4 (Alternative Designs)

FIG. 4 includes shows various other alternatives/options/examples for the two part base assembly 102 that forms part of the new low water cutoff switch, according to some embodiments of the present invention For example, FIG. 4A shows a two part base assembly 102, e.g., for an option having a fastener 120 coupling together the upper and lower base parts 107, 117.

Further, FIG. 4B shows the two part base assembly, e.g., for an option having the upper base part 107 and the lower base part coupled together using a permanent adhesive (not shown). A person skilled in the art would appreciate and understand that adhesives are known in the art for coupling a non-metallic part to a metallic part, including DELRIN® and brass, and the scope of the invention is not intended to be limited to any particular type or kind thereof either now known or later developed in the future. The adhesive may include a glue, epoxy, etc. that is either now known or later developed in the future.

Furthermore, FIG. 4C shows the two part base assembly 102, e.g., for an option having an O-ring 122 arranged between the metal and non-metal base parts so as to avoid probable leakage.

In each option, the upper non-metallic base part 107 may be machined from bar stock or made using an injection mold process. The lower metallic base part 117 may be machined, cast or forged. The upper non-metallic base part 107 and the lower metallic base part 117 may be joined using bolts, screws, mechanical fasteners like element 120, etc., as well as the adhesive.

Heat Transfer Coefficient

The heat transfer coefficient in thermodynamics and in mechanics is understood to be a proportionality coefficient between the heat flux and the thermodynamic driving force for the flow of heat (i.e., the temperature difference, $\Delta T$):

$$h = \frac{q''}{\Delta T}$$

where
- q": heat flux, $W/m^2$ i.e., thermal power per unit area, $q = dQ/dA$
- h: heat transfer coefficient, $W/(m^2 \cdot K)$
- $\Delta T$: difference in temperature between the solid surface and surrounding fluid area, K It is used in calculating the heat transfer, typically by convection or phase transition between a fluid and a solid.

Table of Thermal Conductivity Values (k)

By way of example, the table below lists thermal conductivity values (k) for a variety of materials, in units of $W/m/°C$.

| Material | k | Material | k |
| --- | --- | --- | --- |
| Aluminum (s) | 237 | Sand (s) | 0.06 |
| Brass (s) | 110 | Cellulose (s) | 0.039 |
| Copper (s) | 398 | Glass wool (s) | 0.040 |
| Gold (s) | 315 | Cotton wool (s) | 0.029 |
| Cast Iron (s) | 55 | Sheep's wool (s) | 0.038 |
| Lead (s) | 35.2 | Cellulose (s) | 0.039 |
| Silver (s) | 427 | Expanded Polystyrene (s) | 0.03 |
| Zinc (s) | 113 | Wood (s) | 0.13 |
| Polyethylene (HDPE) (s) | 0.5 | Acetone (l) | 0.16 |
| Polyvinyl chloride (PVC) (s) | 0.19 | Water (l) | 0.58 |
| Dense Brick (s) | 1.6 | Air (g) | 0.024 |

-continued

| Material | k | Material | k |
|---|---|---|---|
| Concrete (Low Density) (s) | 0.2 | Argon (g) | 0.016 |
| Concrete (High Density) (s) | 1.5 | Helium (g) | 0.142 |
| Ice (s) | 2.18 | Oxygen (g) | 0.024 |
| Porcelain (s) | 1.05 | Nitrogen (g) | 0.024 |

According to ASTM data, the thermal conductivity valve of DELRIN® is in a range of 0.28 (DELRIN® D900P) to 0.36 (DELRIN® D1700P) in units of W/m/° C., and depends on the type of DELRIN® used in the particular application.

The Assembly Drawings in the Provisional Application

The provisional application to which this application claimed benefit contains two assembly drawings, one for an embodiment having a brass base for a round pivot, and another for an embodiment having a brass base for an A/F pivot. These two assembly drawings are incorporated into the present application by reference, for the purpose of showing specific embodiments and corresponding detailed dimensions for the aforementioned embodiments, although the scope of the invention is not intended to be limited to any particular dimension of any particular part, or any particular dimensional relationship between any partciular combination of parts. In particular, the two assembly drawings contain detailed dimensions for making the upper base part made from the non-metallic material. By way of example, the embodiment having the brass base for the round pivot has an opening with a diameter of 0.313 and an inner circumferential channel with a diameter of 0.421, while the embodiment having the brass base for the A/F pivot has a corresponding opening with a diameter of 0.251 and an inner circumferential channel with a diameter of 0.359. In the assembly drawings, see the sub-drawings labeled "Detail A" and "Detail B." All the other dimensions for all the other parts/components in the two embodiments are the same.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. A flow switch assembly used in applications exposed to temperatures below freezing, for mounting onto piping having liquid flowing therein, and having a low cut off switch assembly configured to provide signaling in response to the liquid flowing in the piping, comprising:
    a two-part base assembly having
        a lower base part being configured to be adapted on the piping having the liquid flowing therein, immersed within the piping and subjected to conditions caused by the liquid flowing in the piping, and also configured with a central orifice to receive a paddle arm that pivots on an axis in response to the liquid flowing in the piping, the lower base part being made from a metallic material for responding to the conditions caused by the liquid flowing in the piping, including caustic chemicals flowing in the piping; and
        an upper base part being configured with a corresponding central orifice to receive the paddle arm, and configured with a channel to receive a pivot arm to mount and couple to the paddle arm with a pivot pin to pivot on the axis in order to actuate the low liquid cutoff switch assembly in response to the liquid flowing in the piping, the upper base part being made from a non-metallic material having a corresponding coefficient of heat transfer that is substantially lower than the coefficient of heat transfer of the metallic material of the lower base part that does not allow, or substantially reduces, transfer of cold temperature and negative heat so as to substantially reduce condensation build-up in the low liquid cutoff switch assembly.

2. A flow switch assembly according to claim 1, wherein the lower base part is made from brass.

3. A flow assembly according to claim 1, wherein the upper base part is made from Polyoxymethylene (POM).

4. A flow assembly according to claim 1, wherein the two-part base assembly is configured in some combination that includes the lower base part being made from brass or stainless steel and the upper base part being made from Polyoxymethylene (POM) or Nylon.

5. A flow switch assembly according to claim 1, wherein the upper base part is coupled to the lower base part using bolts, screws or mechanical fasteners.

6. A flow switch assembly according to claim 1, wherein the upper base part and the lower base part are coupled together with an O-ring in between to prevent leakage.

7. A flow switch assembly according to claim 1, wherein the upper base part is injection molded onto the lower base part and coupled together so as to form one base piece.

8. A flow assembly according to claim 7, wherein the lower base part is configured with a coupling rim and the upper base part is configured with a coupling channel to receive the coupling rim when the upper base part is injection molded onto the lower base part.

9. A flow switch assembly according to claim 7, wherein the lower base part is machined, cast or forged when made.

* * * * *